Feb. 26, 1924.  
P. W. DALRYMPLE  
REGULATOR  
Filed Dec. 7, 1921  
1,484,934  
2 Sheets-Sheet 1

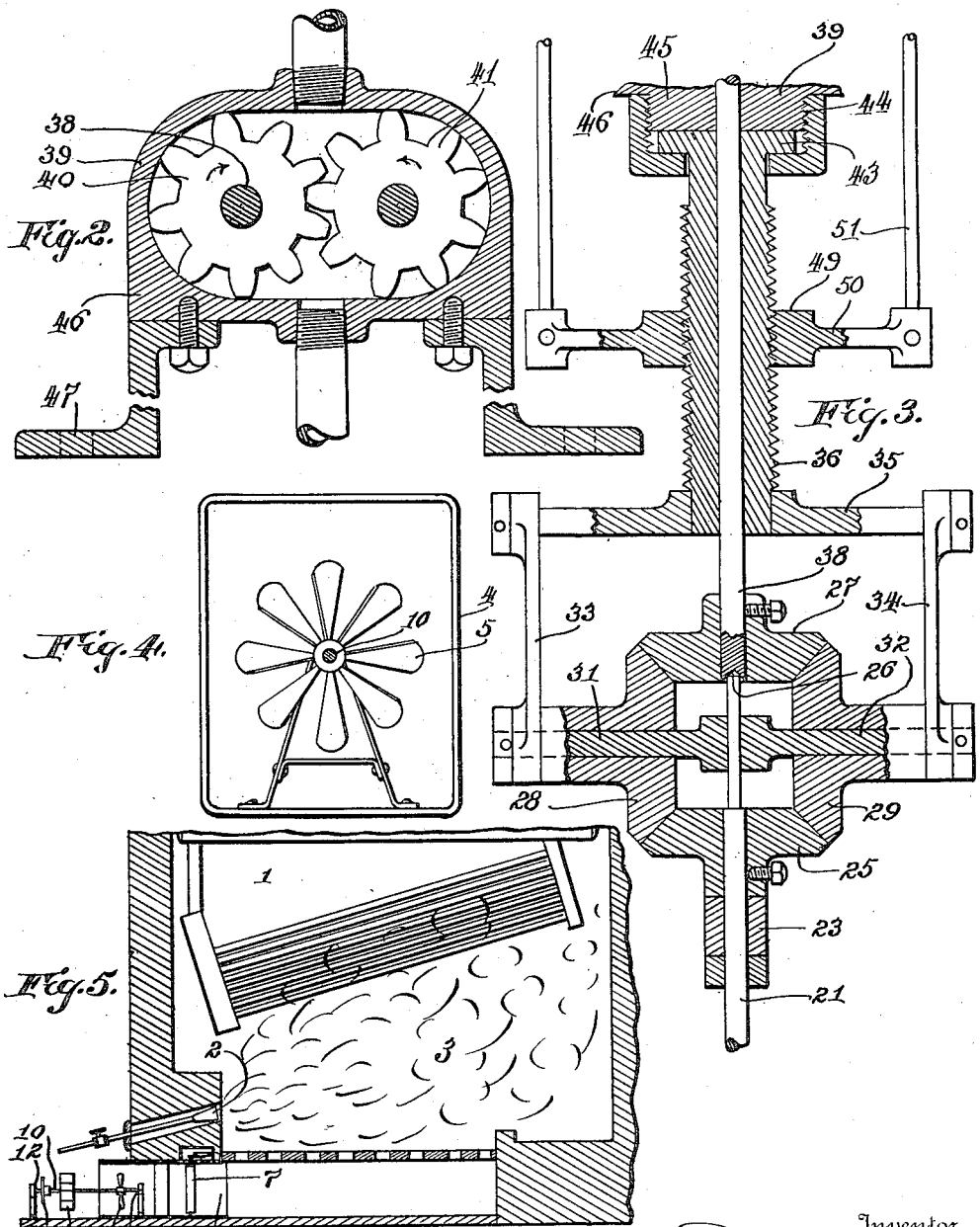

Patented Feb. 26, 1924.

1,484,934

UNITED STATES PATENT OFFICE.

PHILIP W. DALRYMPLE, OF BALTIMORE, MARYLAND.

REGULATOR.

Application filed December 7, 1921. Serial No. 520,543.

*To all whom it may concern:*

Be it known that I, PHILIP W. DAL-RYMPLE, a citizen of the United States of America, residing in the city of Baltimore, State of Maryland, have invented certain new and useful Improvements in Regulators, of which the following is a specification.

In the use of automatic fuel feeds for steam boiler furnaces and the like, whether the fuel be solid, liquid or gaseous, one of the principal difficulties which interferes with the maintenance of the highest efficiency is that incident to the regulation of the air supply so as to give complete combustion without introducing an excess of air beyond that necessary to support combustion, the heating of which excess air to the furnace temperature results in the unnecessary expenditure of a considerable quantity of heat or heat units which in turn involves the burning of an unnecessarily large amount of fuel, the excess fuel being, of course, wasted in heating the excess air.

The operation of the furnace with an insufficient supply of air is likewise objectionable, but less frequent in ordinary furnace practice because it is immediately evidenced by the presence of smoke, the meaning of which is understood by most stokers and firemen, also the laws in the majority of places now prohibit the operation of furnaces in such a manner as to produce noticeable quantities of smoke.

The object of the present invention is to produce a draft regulating means or apparatus which is entirely automatic and which shall serve at all times while the furnace is in operation to regulate the air supply in accordance with the rate at which the fuel feed is operating. This is accomplished in the present instance by combining the motion of the air draft and the motion of the fuel supply utilizing the variation of the ratio of draft to fuel feed to regulate the draft in any convenient manner.

More particularly the invention consists in combining the motion of a member which is caused to move at a rate approximately proportionate to or at a rate which bears a predetermined relation to the rate of fuel feed with the motion of an element driven at a speed which is proportionate to or substantially proportionate to or bears a predetermined relation to the speed of the air draft so that the variation of each from the other is translated into an irregular motion which serves to regulate the draft. In the form illustrated it operates one or more dampers.

Briefly stated, the method of my invention consists in combining a function of the draft with a function of the fuel feed obtaining a motion which varies in direction and extent with the ratio of the fuel feed to the draft and utilizing said motion to increase and decrease the draft substantially in proportion to the variation of said ratio.

In the accompanying drawing I have illustrated an apparatus embodying my invention in so far as the invention relates to the apparatus, the same being applied to a boiler furnace the latter being more or less diagrammatically shown. This apparatus is also capable of use in the practice of the draft regulating method of my invention.

In the drawings:

Figure 2 is a sectional view illustrating a form of pump or motor;

Figure 3 is a section on an axial plane showing a differential whereby the speed of the draft and the speed of the fuel feed may be combined to produce a second motion which is a function of both, which in turn serves to control the draft;

Figure 4 is a cross section through the air duct showing the fan which translates the air draft into mechanical movement for the purposes of draft regulation as aforesaid;

Figure 5 is a longitudinal, vertical section showing a furnace to which the fuel is fed automatically in the form illustrated, the fuel is oil or other combustible liquid sprayed into the fire box under pressure.

Figure 1:
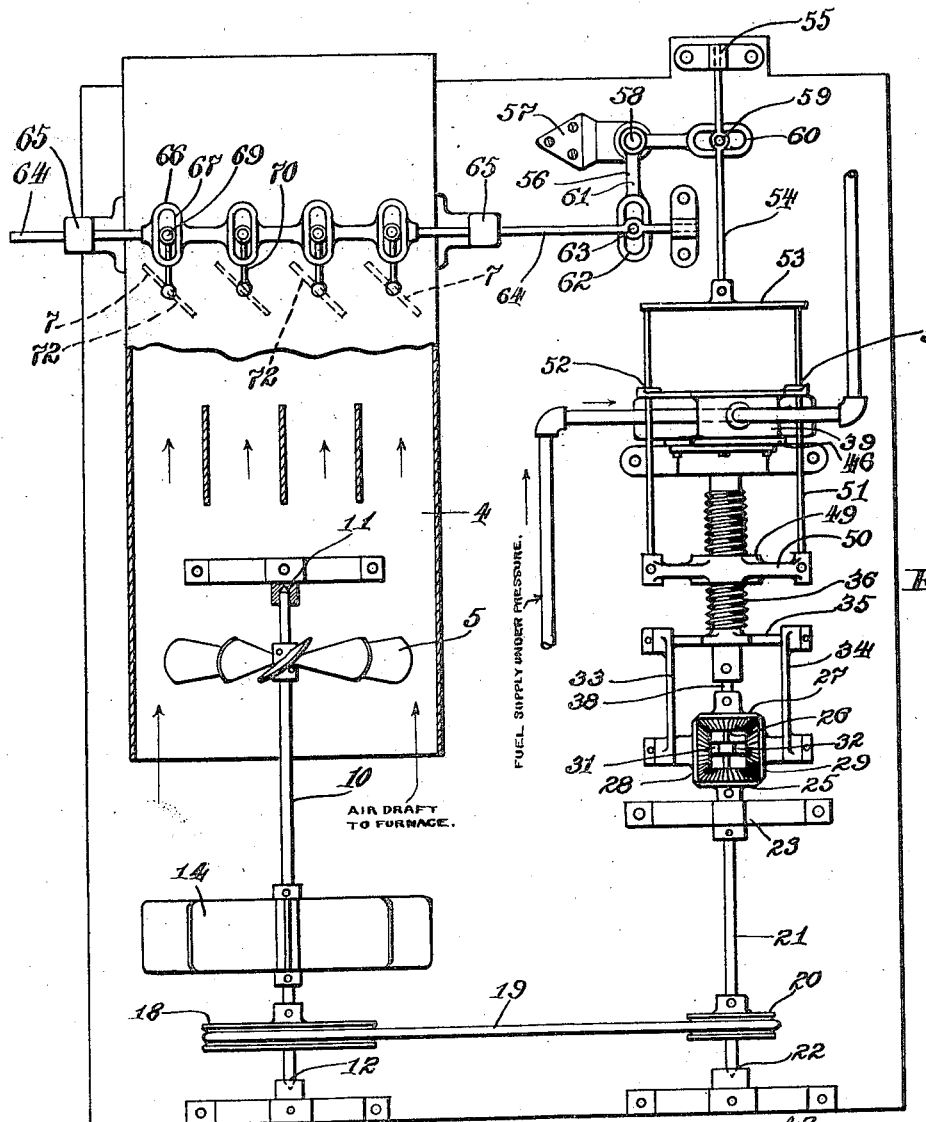
Figure 1 is a diagrammatic assembly of the draft regulating apparatus.
Figures 6, 7:
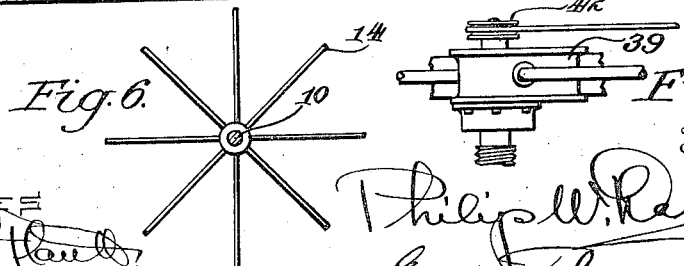
Figure 6 is an elevation of the drag or brake fan.
Figure 7 is a plan of the motor or pump.

Referring to the drawings by numerals:

The furnace 1 which in the form illustrated is equipped to burn oil or other combustible liquid, the same being supplied under pressure and sprayed into the furnace by way of a nozzle 2 which projects it into the fire box 3. The invention may, however, be applied to any furnace having an automatic fuel feed. Air is led into the furnace by way of an air duct 4 in which is mounted a draft actuated fan 5. In the present instance the draft is automatically controlled by means of a series of dampers 7 set in a series of openings through which the draft to or from the furnace passes.

Referring now particularly to Figure 1, the fan 5 as shown is mounted in the passage 4 by way of which the air to support combustion is led to the furnace. This fan 5 which has its axis extending in the direction of the passage 4, is secured to a small shaft or pivot 10 which may have pivot bearings 11, 12 at each end. This shaft 10 carries a drag or brake which may be in the form of a fan 14. The purpose of the brake is to equalize the fan motion by providing a load which necessitates the generation of a relatively considerable amount of power, the driving fan 5 being designed for this purpose. The equalizing load minimizes the variation of the fan speed by reducing the relative variation of load which may result from changes of resistance due to the operation of the gearing as hereinafter described.

Forward of the brake or drag 14 is a grooved pulley 18 likewise secured to the shaft 10 over which pulley passes a belt or cord 19 driving a pulley 20 on the shaft 21, the shaft 21 has a pivot bearing at the forward end at 22 and a second bearing or support at 23 beyond which the shaft 21 carries a beveled gear 25, the shaft 21 as shown extending through the gear 25 and taking a bearing at its extreme end 26 in a tapered socket or pivot point in an oppositely disposed beveled gear 27 mounted in axial alignment with the gear 25 as hereinafter described. The beveled gears 25 and 27 mesh with two beveled gears 28 and 29 having their axes at right angles to the axes of the gears 25 and 27 pivoted on separate studs 31 and 32 mounted in the arms 33 and 34 of a yoke 35 which is secured to the worm 36. The beveled gear 27 which is opposite to the bevel 25 on the shaft 21 is carried by and secured to a shaft 38 which is in alignment with the shaft 21 and which extends through an axial opening in the worm 36, the same being hollowed out for this purpose, the shaft 38 extends backward to the gear pump or motor 39, the gear 40 of which is mounted on and secured to the shaft 38, the other gear 41 meshing with the gear 40 rotates with it. As already pointed out the gear pump or motor 39 may operate either as a motor or meter or pump being actuated by the flow of the liquid fuel or it may in fact be driven by any suitable means as pulley or gear 42 so that it actuates or propels the stream of fluid fuel to the furnace. In either event it rotates at a speed which is approximately proportionate to the motion or speed of the stream of fuel, and the shaft 38 rotating with the gear 40 of the pump, also rotates at a speed corresponding to the speed of the fuel. The four beveled gears 25, 27, 28 and 29 in the combination in which they are illustrated will be referred to herein as a differential, in that so long as the opposite gears 25 and 27 rotate at equal speeds, the gears 28 and 29 will rotate in place without having any motion of translation, i. e., the yoke 33, 34, 35, will be stationary, likewise the worm 36 which as foresaid is rotatively mounted on the shaft 38, being also swivelled at its upper end in that it is provided with a flange 43 set in a bearing cup 44, which is threaded on to a suitable boss 45 on the pump casing 46, the latter being secured by means of ears 47 to a stationary support.

It being borne in mind that the yoke 35 is secured to the worm, it is apparent that any difference in speed of rotation between the shafts 21 and 38 will result in the rolling of the gears 28 and 29 about the gears 25 and 27 in turn, rotating the yoke 35 and the worm 36. This latter worm 36 is engaged by a nonrotative nut 49 having radiating arms 50 carrying sliding rods 51 which extend backward parallel to the shafts 21 and 38, the rods being in fact mounted in slide bearings 52 on the pump casing and connected at their rear ends by cross arm 53 which carries a thrust rod 54 mounted to slide in a suitable bearing 55 at its rear end.

The sliding rod 54 engages one arm of a bell crank 56 which is pivoted on a stationary bracket 57, the stud or pivot being indicated by reference character 58, the engagement referred to consists of a pin 59 carried by the sliding rod 54, which pin engages a radial slot 60 in the arm of the bell crank lever. The other arm 61 of the bell crank which as shown is substantially at right angles to the arms 54, is likewise radially slotted at 62 and the slot is engaged by a pin 63 carried by a second sliding rod 64 which slides in bearings 65, the same being disposed at right angles to the sliding rod 54. This sliding rod 64 carries intermediately of its length a member 66 having slots 67 at right angles to the direction of motion of the sliding rod 64. These slots are engaged each by a pin 69 carried by a swinging arm 70, which arm serves to actuate a corresponding damper 72 serving to control the available area of the passage 4.

It will be apparent that in operation whether the pump or meter or motor 39 is externally driven operating as a pump or is driven as a motor by the stream of fuel, the speed of rotation of the member 39 is at least approximately proportionate to the flow of fuel and that the rotation of the fan 5 driven by the air draft, particularly when equalized by an excess load in the form of a brake 14, rotates at a varying speed which is at least approximately proportionate to the speed of the draft but these two motions communicated to the gears 25 and 27 as they vary produce a variable motion of the yoke 33, 34 and 35, which in turn rotates the worm 36 and moves the sliding rod 54, in turn operating the dampers and it is also apparent that the motion of the dampers and the relation of this motion to the speed of the draft and fuel feed is entirely determined by the aforesaid gear ratio so that the apparatus may be designed to give any desired flue opening or draft control to correspond to the ratio of draft to fuel feed changing as this ratio changes. Preferably this ratio of draft to fuel feed is determined experimentally at the time of installation so that the proportions of the mixture, i. e., air to fuel are controlled by the engineers designing the plant and are removed from the discretion of the attendant or operator of the plant.

I have thus described a draft regulating method in accordance with my invention and an apparatus by which the method of the invention may be practiced, the invention comprising in fact both the method and the apparatus, however, the description is specific and in detail in order that the operation of the invention may be clearly understood, however, the specific terms herein are used descriptively rather than in a limiting sense, the scope of the invention being defined in the claims:

What I claim and desire to secure by Letters Patent is:

1. The method of draft regulation for furnaces which consists in varying the area of the draft passage in direct proportion to the increase of the ratio of the fuel feed to the speed of the draft.

2. The method of draft regulation which consists in combining a function of the draft with a function of the fuel feed and increasing and decreasing the draft approximately in accordance with the variations of the combined functions from a predetermined fixed mean.

3. The method of operating a furnace which consists in combining a function of the draft with a function of the fuel feed obtaining a motion which varies in direction and extent with the variation of the ratio of the fuel feed to the draft and utilizing said motion to increase and decrease the draft substantially in direct proportion to the variation of said ratio.

4. The combination in a furnace of fuel feeding means, a feed indicating member moving approximately in proportion to the speed and pressure of the said feed, a draft indicating member moving with predetermined relation to the draft, differential mechanism for combining the said motions, draft controlling means and means for communicating said resultant motion to said draft control.

5. In a furnace in combination, means moving approximately in proportion to the rate of fuel feed, means moving in approximate proportion to the speed and pressure of the draft, means for combining said motions to produce an intermediate motion which varies approximately as to the variation of the ratio of said motions, draft controlling means and means for communicating the said variable resultant motion to said draft controlling means.

6. In a furnace in combination, means moving approximately in proportion to the rate of fuel feed, means moving in approximate proportion to the speed and pressure of the draft, means for combining said motions to produce a motion which varies approximately as a ratio of said motions varies from a predetermined normal draft controlling means and means for communicating the said variable resultant motion to said draft controlling means to increase and decrease the draft as the ratio of the fuel feed varies from said normal.

7. In a furnace in combination with a fuel feed, means rotating approximately in proportion to the rate of fuel feed, means rotating approximately in proportion to the speed and pressure of the draft, a differential, means connecting one said rotating member to one member of the differential, means connecting the other rotating member to the other member of the differential, draft controlling means and means for communicating the resultant differential motion to said draft controlling means.

8. In a furnace in combination with a fuel feed, means rotating approximately in proportion to the rate of fuel feed, means rotating approximately in proportion to the speed and pressure of the draft, a differential, means connecting one said rotating member to one member of the differential, means connecting the other rotating member to the other member of the differential, draft controlling means and means for communicating the resultant differential motion to said draft controlling means, said communicating means consisting of a worm rotated by the resultant motion of the differential and a nut driven by said worm.

9. The method of regulation for furnaces by combining a function of the draft with a function of the fuel feed to control the ratio of draft to fuel.

Signed by me at Baltimore, Maryland, this 22nd day of November, 1921.

P. W. DALRYMPLE.

Witnesses:
R. H. BRADY,
C. HINTON.